United States Patent

Kuster et al.

[11] Patent Number: 5,713,976
[45] Date of Patent: Feb. 3, 1998

[54] PROCESS FOR BENDING GLASS SHEETS

[75] Inventors: Hans-Werner Kuster; Karl-Josef Ollfisch, both of Aachen; Georgios Hariskos, Eschweiler, all of Germany; Herbert Radermacher, Raeren, Belgium; Marco Muller, Aachen, Germany

[73] Assignee: Saint Gobain Vitrage, Courbevoie, France

[21] Appl. No.: 336,108

[22] Filed: Nov. 4, 1994

[30] Foreign Application Priority Data

Nov. 4, 1993 [DE] Germany ............... 43 37 559.6

[51] Int. Cl.⁶ ................ C03B 23/025; C03B 23/035
[52] U.S. Cl. ................ 65/106; 65/107; 65/273; 65/287
[58] Field of Search .......... 65/106, 107, 273, 65/275, 285, 287, 291, 269, 182.2, 25.2, 25.4, 244, 93, 94

[56] References Cited

U.S. PATENT DOCUMENTS

| | | | |
|---|---|---|---|
| 3,778,244 | 12/1973 | Nedelec et al. | 65/287 |
| 4,579,577 | 4/1986 | Claassen | 65/287 |
| 4,609,391 | 9/1986 | McMaster | 65/106 |
| 4,775,402 | 10/1988 | Letemps et al. | 65/287 |
| 4,778,507 | 10/1988 | Aruga et al. | 65/106 |
| 4,806,140 | 2/1989 | Krug et al. | 65/287 |
| 4,813,993 | 3/1989 | Letemps et al. | 65/106 |
| 5,017,210 | 5/1991 | Petitcollin et al. | 65/106 |
| 5,071,461 | 12/1991 | Hirotsu et al. | 65/106 |
| 5,135,558 | 8/1992 | Petitcollin et al. | 65/106 |
| 5,296,014 | 3/1994 | Lesage et al. | 65/287 |

FOREIGN PATENT DOCUMENTS 0 531 152 A2  10/1993  European Pat. Off. .

*Primary Examiner*—Steven P. Griffin
*Attorney, Agent, or Firm*—Oblon, Spivak, McClelland, Maier & Neustadt, P.C.

[57] ABSTRACT

Process for bending glass sheets, particularly in pairs, in which the glass sheets undergo a pre-bending under the effect of gravity in a horizontal position on a concave annular bending ring (3) whose profile corresponds to the desired final profile of the glass sheets, until the edges of the glass plates are applied entirely to the bending block (3). A monolithic convex bending block (31) is then applied over the whole surface and acts from above on the glass sheets (21). The inner part of the sheets then undergoes supplementary bending which gives it the desired final shape, the glass sheets being pressed by suction, against the monolithic convex bending block, at the edge of the monolithic convex bending block (11).

1 Claim, 2 Drawing Sheets

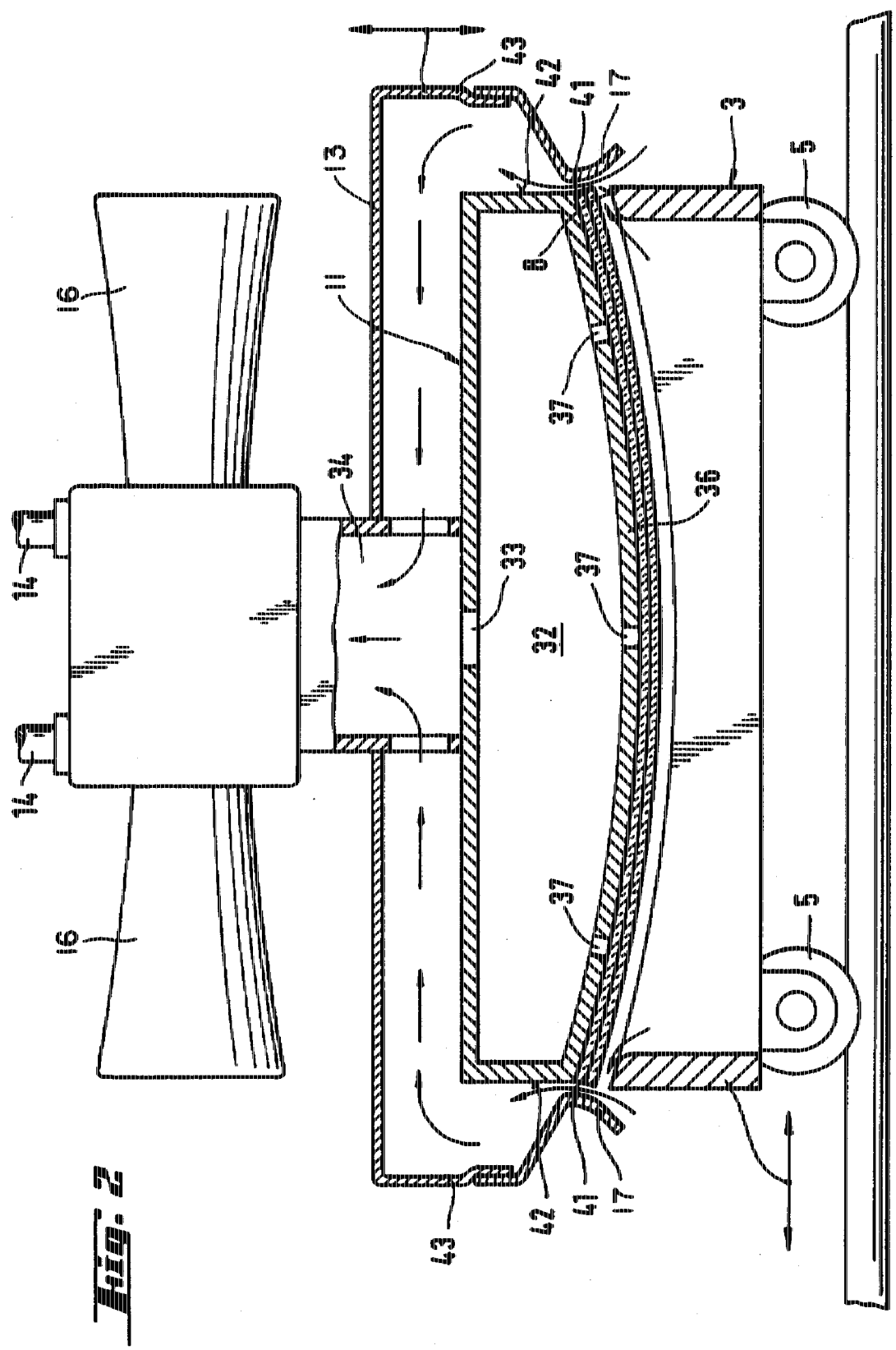

:# 5,713,976

PROCESS FOR BENDING GLASS SHEETS

BACKGROUND OF THE INVENTION

1. Field of the Invention

The present invention relates to a process for bending glass sheets, a process according to which the glass sheets undergo, in a horizontal position on a concave annular bending block, a pre-bending under the effect of gravity, followed by supplementary bending by means of a monolithic convex bending block acting from above on the pre-bent sheets and over their whole surface. The invention also relates to a device for the application of this process.

2. Description of the Related Art

A process of this kind is know, for example, from the document EP 351 739. According to this process, after pre-bending on a bending block, the glass sheets undergo supplementary bending by mechanical pressing, this bending block being used as the bottom bending die. Another process of this kind is known from the document EP 0 531 152 A2. According to this process, after pre-bending on the bending block the glass sheets are raised from the block and placed on a bottom die for press-bending. In the supplementary bending, the glass sheets are also bent by mechanical pressing to receive their final shape.

The known processes of this kind are not free of problems. For example, if a bending block is used as the bottom bending die for the supplementary bending it is impossible to prevent the glass sheets from retaining a large degree of bending in the inner part of the peripheral part, which is produced during the pre-bending under the effect of gravity. If, in order to avoid this problem, a bending block applied over the whole surface is used as the bottom press-bending block, optical distortions are easily produced in the glass sheets, these distortions originating from the fact that the first contact causes, in the area of greatest bending, deformations on small surfaces, these deformations not being entirely eliminated even when the pressing operation is continued. Furthermore, the known processes of this type which use mechanical presses generally require considerable expenditure on construction.

SUMMARY OF THE INVENTION

The object of the present invention is to provide a process of the type mentioned according to which it is possible to bend at least one glass sheet, the process being intended in particular for the manufacture of compound glazing giving it a desired final shape at a relatively low cost. According to this process, the shape of the glass sheet must be very precise both in the peripheral and in the inner part and, consequently, optimal optical properties; in other words, the smallest possible optical distortions must be obtained over the whole surface. The process must also permit the reforming, in the following press-bending phase, of the glass sheets which have undergone excessive bending during the pre-bending under the effect of gravity, without in any way reducing the optical quality.

This object is achieved, according to the invention, in that in the operation of pre-bending under the effect of gravity, the glass sheets present on a concave annular bending ring correspond to the desired final shape of the glass sheets, until their edges are entirely applied to this concave annular block, and in that it is then bent, taking on the desired final shape, by means of a monolithic convex bending block applied over the whole surface in the inner part within the peripheral part. For this purpose, the glass sheets are pressed against the monolithic convex bending block applied to their whole surface, by suction at the edge of this monolithic block.

This process is more particularly suitable for the simultaneous bending of two sheets of glass intended for the production of compound glazing such as the windscreen of a motor vehicle.

The object of the invention is therefore to carry out the pre-bending process in such a way that, under the effect of gravity, the glass sheets are in all cases deformed to such an extent that they take on their final shape in the peripheral part. Depending on the desired final shape, the inner part of the glass sheets may bend more or less than the desired amount under the effect of gravity. Following the pre-bending on the concave annular block, the glass sheets are applied, in the supplementary bending phase, to the upper monolithic convex bending block, whose shape corresponds to the desired final shape of the glass sheets, by suction of air around the end of the monolithic convex bending block which is applied to the whole surface of the sheets.

If, at the end of the pre-bending phase, the bending in the inner part of the glass sheets is greater than the desired final bend, the greater bending of the inner part is removed by the suction operation. Excessive bending of this kind, which occurs particularly in the area of transition between the inner parts of the glass sheets and their peripheral parts is thus rectified by the operation of press-bending under the effect of the suction.

In the supplementary bending phase which has the object of correcting the shape, the peripheral part of the glass sheets, which already has the theoretical shape, is applied to the monolithic convex bending block which covers the whole surface. However, since the monolithic convex bending block which is applied to the whole surface is always covered by a refractory air-permeable fabric or membrane, the current of air sucked out which passes the edge of the peripheral part of the glass sheets creates a partial vacuum between the surface of the monolithic bending block and the upper glass sheet. Particularly in the case of two glass sheets bent simultaneously, this partial vacuum is sufficient to press the whole surface of the upper glass sheet against the bending block and in this way to correct the excessively bent parts. At the same time, the current of air sucked out, which acts around the whole perimeter of the glass sheets, prevents air from penetrating between the two glass sheets during this correction phase, so that the lower glass sheet is also subjected to this correction of the bending, something which is not possible if the pair of glass sheets is sucked by a partial vacuum acting an the upper surface of the glass sheet.

The process according to the invention is also advantageous if, at the end of the pre-bending phase, the inner part of the glass sheets has a smaller degree of bending than the desired final bend. In this case, the peripheral part of the glass sheets is pressed by suction against the upper monolithic convex bending block, thus providing a supplementary bending of the glass sheets in their inner part. If the glass sheets have a smaller degree of bending in their inner part than the upper monolithic convex bending block corresponding to the desired final shape of the glass sheets, then, during their movement towards the upper monolithic convex bending block, the glass sheets touch this upper bending block with their inner part initially, and the peripheral part of the glass sheets, which already have the final bend do not at first come into contact with the said upper bending block. Under the effect of the suction around the edge of the upper monolithic convex bending block intended to be applied to the whole surface, the peripheral part of the glass sheets is then subjected to a force acting towards the upper monolithic convex bending block and, under the effect of this force, the areas of the glass sheets having a less than the desired degree of bending undergo supplementary bending which gives them their desired final shape.

By the process according to the invention, it is therefore possible simultaneously to reduce, by bending in the opposite direction, the bending of excessively bent areas, and to provide supplementary bending for parts of the glass sheets which are insufficiently bent. These two correction operations may even take place simultaneously on the same glass sheets. This is the case, for example, when it is necessary to produce glazings whose radius of curvature varies between parts of the surface.

BRIEF DESCRIPTION OF THE DRAWINGS

Further details and advantages of the invention will be understood from the following description which refers to FIGS. 1 and 2 which represent a preferred embodiment of the invention corresponding to the simultaneous bending of two glass sheets.

FIG. 2 is a detail, in section, of a suction bending device used according to the invention.

DETAILED DESCRIPTION OF THE PREFERRED EMBODIMENT

Figure 1:
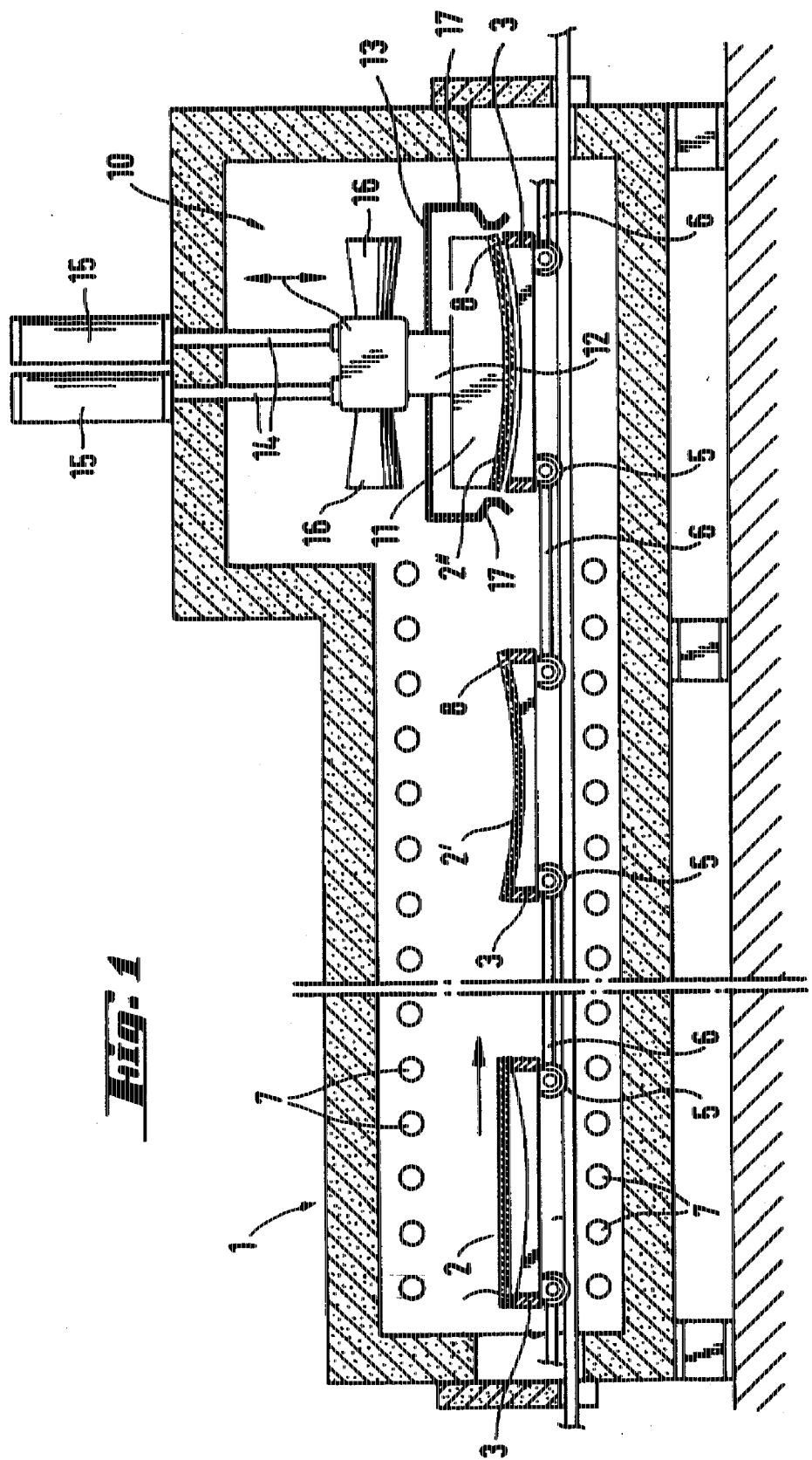
FIG. 1 is a longitudinal section through a bending furnace according to the invention.

FIG. 1 shows a general view of an installation for bending glass sheets. It comprises a continuous horizontal furnace 1 in which pairs 2 of glass sheets are moved on concave annular bending rings 3 and heated to reach the bending temperature.

Each pair 2 of glass sheets is placed on a concave annular bending ring 3 whose shape corresponds exactly to the desired final shape of the glass sheets in their peripheral part. The bending rings 3 are mounted in such a way that they can be moved on casters 5 and are linked together by coupling members 6. Heating elements 7 which heat the glass plates 2 to the bending temperature are disposed above and below the plane of movement of the annular bending blocks.

When seen in the direction of movement of the glass sheets, there is, at the rear end of the furnace, a press-bending station 10, provided with an upper monolithic convex bending block 11 which is applied to the whole surface. The monolithic convex bending block 11 is fixed by means of supports 12 to a casing 13 which, by means of rods 14 and a lifting mechanism 15, can be moved upwards and downwards. Suction fans 16 are placed above the casing 13. After the supplementary bending operation, the glass sheets 2 may be transferred on the annular bending ring 3 from the furnace 1 to a cooling station (not illustrated) disposed after the press-bending station.

With this bending device, the operation is performed in the following way: in a transfer station (not illustrated), the flat glass sheets 2 are placed in sets of two to the concave annular bending rings 3. On these bending rings 3, the pairs of glass sheets 2 are moved at a specified operating rate inside the horizontal continuous furnace 1 while being brought to the bending temperature. Under the effect of gravity, the glass sheets 2 then assume a bent shape. The process is carried out at sufficiently high temperature and for a sufficiently long period for the glass sheets 2 to have their peripheral parts applied against the annular bending surface 8 of the bending ring 3.

The pre-bending of the glass sheets 2 and their movement in the horizontal continuous furnace may take place independently of each other. However, it is particularly advantageous to make the operations of pre-bending and movement of the glass sheet take place simultaneously.

The pairs 2' of pre-bent glass sheets are then carried under the upper monolithic convex bending block 11 which is to be applied to the whole surface. When a pre-bent pair of glass sheets has reached its position below the monolithic convex bending block 11, the upper bending block 11 is lowered by means of the lifting device 15, until the pre-bent pair 2' of glass sheets can be brought by suction against the upper monolithic convex bending block 11. For this purposes the suction fans 16 are put into operation. The suction fans 16 produce an outflow of air around the monolithic convex bending block 11 which is sufficient to raise the pair of glass sheets from the lower annular bending ring 3. However, it is not essential to completely raise the pre-bent glass sheets from the lower annular bending ring 3; it is also possible to lower the upper monolithic convex bending block 11 through a distance such that the glass sheets remain in contact with the bending ring 3.

It is advantageous for the casing 13 to be provided, at its lower edge, with a surrounding flange 17 which reduces the gap between the casing 13 and the monolithic convex bending block 11. This also reduces the gap between the glass sheets 2' and the casing 13. It is advantageous to reduce this gap to a minimum since this decreases the flow of air required, without reducing the rate of flow at the edge of the glass sheets and therefore without reducing the lifting effect of the partial vacuum. In this way, it is possible, to obtain the desired partial vacuum and consequently the force required to correct the bending of the glass sheets, and to use smaller and less expensive vacuum generators.

If necessary, it is also possible to eliminate the gap completely and, by appropriate means, to close the space between the annular bending ring 3 and the casing 13, for example by using elastic lips. In this way, the whole of the partial vacuum produced by the suction fans is effective between the pair of glass sheets and the upper bending block, around the whole perimeter of the sheets. This enables the effective partial vacuum acting on the glass sheets to be increased to a maximum level.

After the press-bending at the bending station 10, the glass sheets 2" which have assumed their theoretical shape by bending are again placed on the annular bending blocks 3, by means of which they are brought to a cooling station which is not illustrated.

FIG. 2 shows details of the embodiment of the press bending station 10 of FIG. 1. It will be seen that the upper monolithic convex bending block 11 applied to the whole surface is hollow. The hollow space 32 is connected by an opening 33 to the suction duct 34 on which the two suction fans 16 are fixed by flanges. The actual forming plate 36 may be covered by a refractory air-permeable fabric or membrane (not shown) and is provided with openings 37 whose primary function is to separate the bent pair of glass sheets from the forming surface after the supplementary bending operation. For this purpose, an excess pressure is briefly created in the hollow space 32 of the bending block when the pair of glass sheets has to be replaced on the annular bending ring 3.

The bending block 11 is surrounded by a casing 13 which forms a hollow closed space around the bending block 11 and leaves only a continuous gap 41 between the peripheral surface 42 of the bending block 11 and the wall 43 of the casing 13. This gap 41 which extends around the whole periphery is formed by a skirt 17 which is connected to the wall 43 and which, in the operating position of the suction bending device, ends at approximately the height of the forming surface of the bending ring 3. The inner profile of the skirt 17 is matched to the perimeter of the glass sheets, and may be replaced by other skirts, depending on the required geometry.

When the suction fans 16 are started, there is a displacement of the air through the gap, which is sucked perpendicularly to the surface of the pair of glass sheets at its periphery, in the direction of the arrows. This produces the described lifting effect and presses the two glass sheets against the bending surface of the forming plate 36.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. Process for bending at least two sheets of glass laid one upon the other, comprising the steps of:

pre-bending the at least two sheets of glass laid one upon the other in a horizontal position on a concave annular bending ring corresponding in shape to the desired final shape of the at least two sheets of glass, under the effect of gravity, so that the at least two sheets of glass are pre-bent until a peripheral part thereof is applied entirely to said annular bending ring so as to form the peripheral part of the at least two sheets of glass to the desired final shape; and fully bending the pre-bent at least two sheets of glass laid one upon the other so as to give the pre-bent at least two sheets of glass a desired final shape, by applying a monolithic convex bending block corresponding in shape to the desired final shape of the least two sheets of glass against an entire upper surface of the at least two sheets of glass laid one upon the other by applying suction only around an edge of the monolithic convex bending block so as to press the peripheral part of the pre-bent at least two sheets of glass against the monolithic convex bending block, prevent air from penetrating between the at least two sheets of glass laid one upon the other, and create a partial vacuum between monolithic convex bending block and the upper surface of the pre-bent at least two sheets of glass laid one upon the other which is sufficient to press the entire upper surface of the pre-bent at least two sheets of glass against the monolithic convex bending block.

* * * * *